(12) United States Patent
Klemm et al.

(10) Patent No.: US 9,066,474 B2
(45) Date of Patent: Jun. 30, 2015

(54) METHOD FOR THE CULTIVATION OF A PLURALITY OF YOUNG PLANTS WHICH DIFFER IN TERMS OF SPECIES OR VARIETY TO FORM A GROUP OF YOUNG PLANTS WHICH CAN BE HANDLED AS A UNIT

(75) Inventors: Nils Klemm, Stuttgart (DE); Ulrich Sander, Stuttgart (DE); Antonius De Bresser, El Dongen (NL); Dirk Schimmelpfeng, Remseck (DE); Andreas Rinnergschwentner, Pfinztal-Sollingen (DE)

(73) Assignee: SELECTA KLEMM GMBH & CO. KG, Stuttgart (DE)

( * ) Notice: Subject to any disclaimer, the term of this patent is extended or adjusted under 35 U.S.C. 154(b) by 366 days.

(21) Appl. No.: 13/428,093

(22) Filed: Mar. 23, 2012

(65) Prior Publication Data
US 2012/0240464 A1 Sep. 27, 2012

Related U.S. Application Data

(60) Provisional application No. 61/467,417, filed on Mar. 25, 2011.

(51) Int. Cl.
*A01G 9/02* (2006.01)
*A01G 9/04* (2006.01)

(52) U.S. Cl.
CPC .............. *A01G 9/028* (2013.01); *A01G 9/045* (2013.01)

(58) Field of Classification Search
CPC ............. A01G 1/00; A01G 5/00; A01G 9/02; A01G 9/104; A01G 9/102; A01G 9/10; A01G 9/021; A01G 9/028; A01G 9/00
USPC ...... 47/66.7, 58.1 R, 65.5, 65, 73, 74, 75, 77, 47/78, 85, 86, 87, 66.5, 66.1, 32.7, 32.8, 47/65.9, 71, 39; D11/143, 152–154
See application file for complete search history.

(56) References Cited

U.S. PATENT DOCUMENTS

| 1,424,829 | A | * | 8/1922 | Kleb | ................................ 47/74 |
| 2,022,548 | A | * | 11/1935 | Otwell | .............................. 47/86 |

(Continued)

FOREIGN PATENT DOCUMENTS

DE 3334882 A1 * 9/1983 ............... A01G 9/10

OTHER PUBLICATIONS www.howtogardenadvice.com/plant_list/herb/grow_rosemary.html, Gardening Advice: Instruction for Growing Rosemary, last visited Feb. 25, 2014.

(Continued)

*Primary Examiner* — Andrea Valenti
(74) *Attorney, Agent, or Firm* — Carter, DeLuca, Farrell & Schmidt, LLP

(57) ABSTRACT

A method for cultivating a plurality of young plants of different species or variety to form a group of young plants which can be handled as a unit. The method includes providing a plurality of propagation pots, each containing a substrate, which allow roots that form in a propagation pot to grow out at the sides, loading at least one growing container with the plurality of propagation pots such that the propagation pots arranged in each growing container contact one another along a portion of their lateral peripheral surface, introducing at least one cutting or seed into each propagation pot, and allowing roots to form in the propagation pots of each growing container until roots emerging from the sides of the propagation pots have formed a network of roots binding the propagation pots together as a cluster of propagation pots.

22 Claims, 2 Drawing Sheets

(56) References Cited

U.S. PATENT DOCUMENTS

| | | | |
|---|---|---|---|
| 2,957,274 A * | 10/1960 | Colvin | 47/17 |
| 3,611,633 A * | 10/1971 | Shackelford | 47/78 |
| 4,961,284 A * | 10/1990 | Williams | 47/66.5 |
| 5,501,040 A * | 3/1996 | White-Wexler et al. | 47/82 |
| 6,901,700 B2 * | 6/2005 | Trabka | 47/86 |
| 7,171,782 B2 * | 2/2007 | Felknor et al. | 47/73 |
| 7,891,134 B2 | 2/2011 | Wismans | |
| 7,946,078 B1 * | 5/2011 | VanWingerden | 47/73 |
| 8,033,049 B2 * | 10/2011 | St. Clair et al. | 47/65.9 |
| 2003/0046866 A1 | 3/2003 | Mendes | |
| 2005/0274073 A1 * | 12/2005 | Brooke et al. | 47/59 R |
| 2007/0089357 A1 * | 4/2007 | Bowdish | 47/18 |
| 2007/0227066 A1 | 10/2007 | Crawford | |
| 2009/0277087 A1 * | 11/2009 | Kim | 47/85 |

OTHER PUBLICATIONS www.greengardener.co.uk/product.asp?id_pc=16&cat=14&id_product=205, Green Gardener.co.uk, The natural way to keep your garden looking good, last visited Feb. 25, 2014.

Handbook of herbs and spices, vol. 2, Woodhead Publishing in Food Science and Technology, 2004.

* cited by examiner

METHOD FOR THE CULTIVATION OF A PLURALITY OF YOUNG PLANTS WHICH DIFFER IN TERMS OF SPECIES OR VARIETY TO FORM A GROUP OF YOUNG PLANTS WHICH CAN BE HANDLED AS A UNIT

TECHNICAL FIELD

The present disclosure relates to a method for the cultivation of a plurality of young plants which differ in terms of species or variety to form a group of young plants which can be handled as a unit.

BACKGROUND OF THE RELATED ART

So-called mixed pots, containers and hanging baskets, that is to say cultivation vessels for the consumer which are planted with different varieties of a plant species or alternatively with different plant species, have recently gained considerable market significance. Typically, such products are produced by cultivating individual young plants of the different varieties or species separately and then planting them together in a cultivation vessel (pot, container, hanging basket, etc.). The young plants are conventionally cultivated by sowing or by planting out an unrooted cutting in a propagation pot suitable for the cultivation of young plants, which can be, for example, a pot made of nonwoven material (also referred to as a paper pot), a so-called Jiffypot® or a so-called Preforma® pot. A pot made of nonwoven material is a substantially hollow cylindrical container made of a fleece-like nonwoven paper material which receives the substrate material used to cultivate the young plant. A Jiffypot® consists of dried, compressed peat enclosed by a biodegradable net. It swells when water is added and thus acquires its actual shape. A Preforma® pot is a compressed structure formed of the substrate material, for example peat, and an organic adhesive, which is able to receive the seed or cutting directly. Pots made of nonwoven material, Jiffypot® pots or Preforma® pots do not themselves have sufficient stability and must therefore be placed in a growing container which permits safe handling of the pots made of nonwoven material, Jiffypot® pots or Preforma® pots provided with seeds or cuttings and allows the water necessary for cultivation and, where appropriate, nutrient liquids etc. to be supplied to the substrate material. A cultivation tray contains a large number of such growing containers, which are also called cells, and permits efficient handling of all the propagation pots contained in the growing containers.

In order to produce mixed pots, containers and hanging baskets, different desired young plants cultivated as described above must be planted together in the cultivation vessel intended for sale, e.g. a pot, container or hanging basket, which is conventionally carried out by a finished product producer. The planting of the different desired young plants in a pot or the like clearly represents a considerable complexity in terms of logistics and organisation. There is also a considerable risk that the correct young plants will not always be planted in a pot.

As an alternative, it is known from U.S. Pat. No. 7,891,134 B2 entitled Method of Producing a Horticultural Display issued to Wismans to root cuttings of different varieties and/or species together in a single propagation pot. The fundamental advantage of this method is that it saves a considerable amount of work for the finished product producer and avoids the occurrence of errors when desired young plants are subsequently planted together as described above. It is a disadvantage, however, that it is possible to root together only cuttings of varieties or species that have at least approximately the same cultivation needs in terms of temperature, water supply, substrate material, etc. during rooting and that additionally exhibit the same or at least similar growth characteristics.

SUMMARY OF THE DISCLOSURE

One aspect of the present disclosure is directed to provide a method which allows different plant varieties and/or plant species, in particular also plants having different cultivation needs, to be cultivated in a labour-saving manner to form a group of young plants which can be handled as a unit.

A further aspect of the invention is directed to a method for the cultivation of a is plurality of young plants which differ in terms of species or variety to form a group of young plants which can be handled as a unit. The method includes providing a plurality of propagation pots, each containing a substrate, which allow roots that form in a propagation pot to grow out at the sides, loading at least one growing container with the plurality of propagation pots in such a manner that the propagation pots arranged in each growing container are in contact with one another in at least a portion of their lateral peripheral surface or are pressed against one another introducing at least one cutting or seed into each propagation pot, wherein at least one propagation pot receives a cutting or seed, variety or species, different from at least one other propagation pot; and allowing roots to form in the propagation pots of each growing container until roots emerging from the sides of the propagation pots have formed a network of roots which binds the propagation pots in a growing container together as a cluster of propagation pots and holds them together.

Yet a further aspect of the present disclosure is directed to a method for the cultivation of a plurality of young plants which differ in terms of species or variety to form a group of young plants which can be handled as a unit. The method includes providing a plurality of propagation pots, each containing a substrate, which allow roots that form in a propagation pot to grow out at the sides, introducing at least one cutting or seed into each propagation pot, wherein at least one propagation pot receives a cutting or seed, variety or species, different from at least one other propagation pot; allowing roots to form in the substrate of each propagation pot, loading at least one growing container with the plurality of propagation pots in such a manner that the propagation pots arranged in each growing container are in contact with one another in at least a portion of their lateral peripheral surface or are pressed against one another, and allowing roots to form in the propagation pots of each growing container until roots emerging from the sides of the propagation pots have formed a network of roots which binds the propagation pots in a growing container together as a cluster of propagation pots and holds them together.

BRIEF DESCRIPTION OF THE FIGURES

Various embodiments of the disclosure are described herein with reference to the drawings wherein.

DETAILED DESCRIPTION

Figure 1:
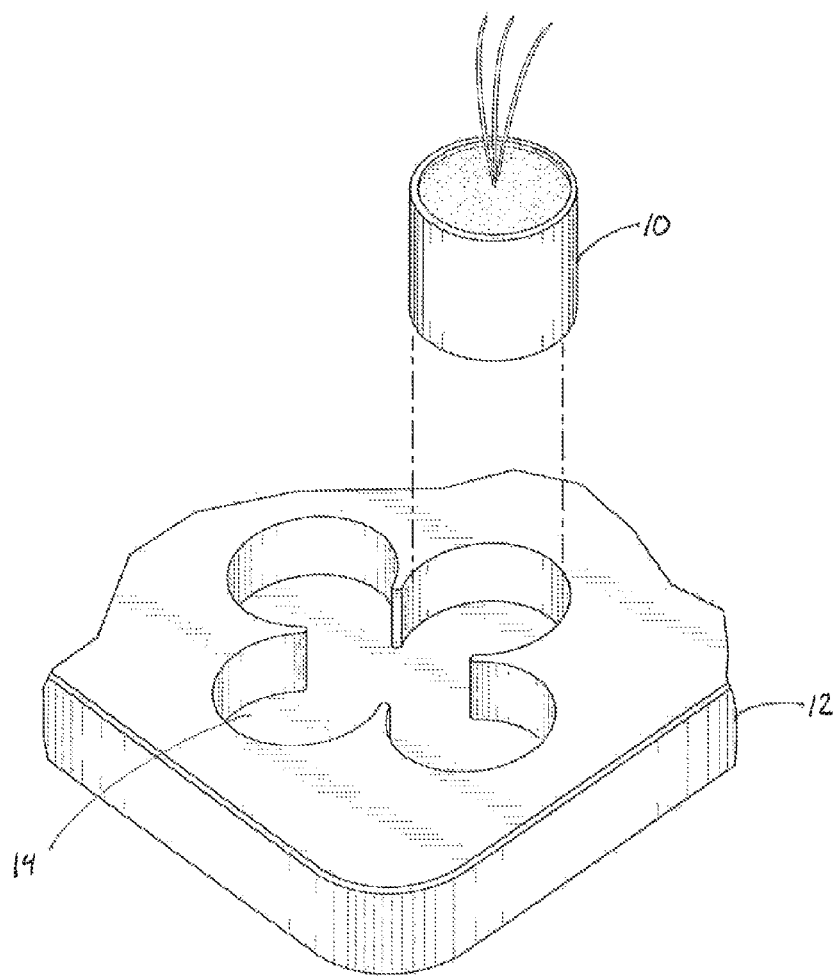
FIG. 1 is a perspective view of a growing container and propagation pot according to an aspect of the present disclosure.
Figure 2:
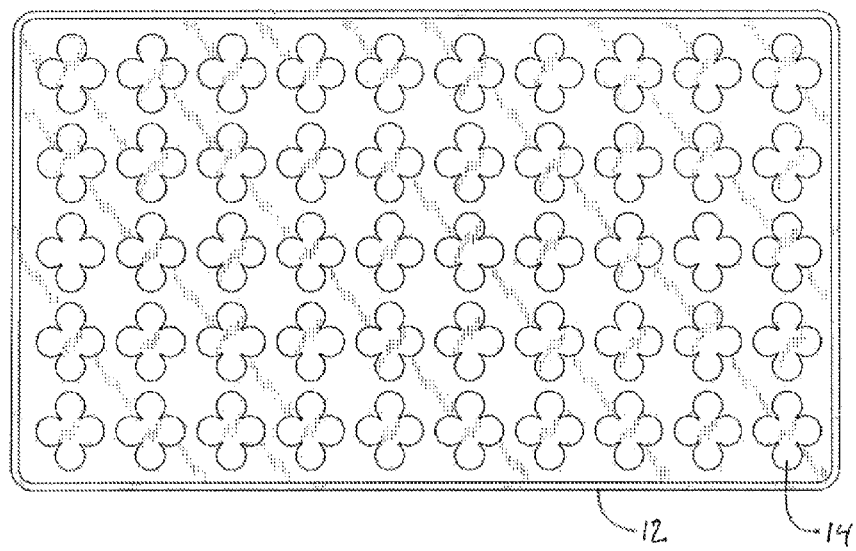
FIG. 2 is a top view of a growing container according to an aspect of the present disclosure.

According to one embodiment of the present disclosure propagation pots 10 are provided as shown in FIG. 1, each propagation pot 10 containing a substrate, and arranged in one or more growing containers 12 in such a manner that at least two propagation pots 10, preferably from two to six propagation pots, are located next to one another (that is to say not stacked, i.e. not on top of one another) in each growing container as a cluster 14 of propagation pots 10. All the propagation pots in a growing container 12 are in contact with one another in at least a portion of their lateral peripheral surface. The mutual lateral contact between the propagation pots 10 will normally, that is to say in the case of cylindrical propagation pots having a round outside wall, have the form of a vertical line or of a vertical strip but, depending on the outer form of the propagation pots used, it can also be extensive or laminary, for example in the case of propagation pots with a rectangular or square cross-section. Nor does the mutual contact between the propagation pots 10 need to extend over their entire height; it is important only that the degree of mutual contact is sufficient to allow enough roots to grow out of the sides of one propagation pot 10 and into an adjacent propagation pot 10 to bind the propagation pots together as a unit. The arrangement of the propagation pots in a growing container 12 can be such that they are pressed together slightly in the lateral direction. This can be achieved, for example, by appropriate shaping of the growing container 12 by means of supporting ribs or the like. The force with which the propagation pots 10 in a growing container 12 are pressed laterally against one another can lead to slight deformation of the propagation pots 10 at the points at which their lateral peripheral surfaces are in contact with one another. A growing container 12 may have multiple clusters 14 as shown in FIG. 2.

One or more cuttings or seeds of in each case one variety or species are then introduced into each propagation pot 10, it being possible for the cuttings to be unrooted, calloused or rooted. In other words, a propagation pot 10 contains only cuttings or seeds of one variety and/or species, but different varieties or species are introduced into the various propagation pots located in a growing container so that a group of young plants of different species and/or varieties is later obtained. Both the loading of the growing containers 12 with the plurality of propagation pots and the is introduction of the cuttings or seeds into each propagation pot can be carried out manually or in an automated manner.

The cuttings or seeds in the cultivation pots are then cultivated in the conventional manner, that is to say they are supplied with the water necessary for cultivation and, where appropriate, with necessary nutrients and the like. In the course of this cultivation process, roots form in the propagation pots of each growing container or already existing roots grow further, and this formation of roots is allowed to continue according to the invention until roots emerging from the sides of the propagation pots 10 have formed a network of roots which binds the propagation pots 10 in a growing container together as a cluster 14 of propagation pots 10 and holds them together. It is not necessary for all the species or varieties located in a growing container to have equally strong root formation. Accordingly, it is not necessary for roots to grow out of the sides of all the propagation pots 10 in a growing container; in fact, it is sufficient, for example, for a propagation pot 10 containing a variety or species with relatively weak root formation to be arranged next to a propagation pot 10 in which a variety or species with a stronger root-forming ability is located. Accordingly, varieties or species with strong root formation can purposively be combined in a growing container 12 with varieties or species with less pronounced root formation. The varieties or species with strong root formation will root into the adjacent propagation pots 10 of the varieties or species with weaker root formation and thus ensure that the propagation pots are bound together as a cluster. In the case of varieties or species with an approximately equally strong root-forming ability, the roots growing out of the sides of the propagation pots will in each case root into is the adjacent propagation pots 10 and thus likewise form a network of roots which not only binds the propagation pots 10 in a growing container together but also holds them together in such a manner that the cluster 14 of propagation pots 10 can be removed from the growing container as a unit.

The above-described embodiment is most suitable for plant species or varieties the cultivation needs of which do not differ too greatly from one another during cultivation, that is to say which have approximately the same requirements in terms of ambient temperature, the amount of water supplied, etc. during cultivation even as cuttings or seedlings.

According to a further embodiment of the present disclosure, propagation pots are provided, each containing a substrate. In accordance with this embodiment the propagation pots are not initially placed in the growing container(s), but one or more cuttings or seeds of in each case one variety or species are first introduced into each propagation pot, it again being possible for the cuttings to be rooted or unrooted. The propagation pots are then cultivated separately for a period of time, namely until a sufficient amount of roots has formed in each propagation pot. For example, species and varieties propagated by means of cuttings frequently have very different general cultivation needs during the rooting phase. Woody plants, for example rosemary, require considerably more time until their cuttings form roots, and in addition their general cultivation needs in the rooting phase are very different to those of herbaceous plants. The time required for the formation of roots ranges from a few days to several weeks, depending on the species. In addition to the time for rooting, the amount of water and the temperature required during rooting also vary in particular. Some species can be propagated by so-called mist propagation, while other species react to the frequent addition of water with an increased susceptibility to fungal infections and must therefore be cultivated without mist but nevertheless at high humidity. Finally, by cultivating the propagation pots separately during the rooting phase it is possible to eliminate any propagation pots containing cuttings or seeds in which rooting has not taken place.

After the formation of the first roots, young plants are able to regulate their water balance via the roots. The cultivation needs of different species then become considerably more alike and it becomes more readily possible to cultivate them together, that is to say to further cultivate different species together. Accordingly the growing container(s) are not loaded with the plurality of cultivation pots until a sufficient number of roots have formed in each propagation pot. The arrangement of the propagation pots in a growing container may be undertaken in the same manner as described above, that is to say the propagation pots in a growing container are in contact with one another in at least a portion of their lateral peripheral surface or are even pressed against one another slightly. As above the propagation pots once placed in a growing container are cultivated further together until roots emerging from the sides of the cultivation pots have formed a network of roots which binds the propagation pots in a growing container together as a cluster of propagation pots and holds the cluster together.

According to the present disclosure, a propagation pot only ever contains one variety is or species. The substrate contained in a propagation pot can therefore be adapted to the particular variety or species. For example, the substrate can have different physical properties according to the variety or species, for example a texture adapted to a variety or species and/or a water-retention capacity (so-called water potential) adapted to that variety or species, and/or it can be provided with a fertiliser adapted to the variety or species. Furthermore, the substrate can have a pH value matched to the particular variety or species. Depending on the variety or species present in a propagation pot, the substrate can also contain a growth regulator, the amount of growth regulator differing according to the variety or species contained in the associated propagation pot. Finally, the substrate can contain a plant-protection agent, for example a fungicide, depending on the variety or species present in a propagation pot. The substrate can also be treated with plant hormones to promote root formation and inhibit the elongation growth of the shoot.

By suitably choosing and/or pretreating the substrate contained in a propagation pot, it is possible not only to adapt the substrate in an optimum manner to the variety or species contained in a propagation pot but also to adjust the growth characteristics of the different varieties and/or species of plants that are present in the propagation pots of a growing container to one another in order thus to enable common cultivation and achieve balanced growth of the various young plants together. Thus very different varieties and/or species can be cultivated in such a manner that they can be dispatched and potted as a young plant unit and very different cultivation needs during the cultivation of the young plants can nevertheless be accommodated. Moreover, the very different cultivation needs of particular plant species and plant varieties during the rooting phase can better be taken care of. As a result of being precultivated separately, specific species and varieties can, for the first time, be brought into a state which subsequently allows them to be cultivated further together with different species and/or varieties.

Further, this embodiment allows species propagated by means of cuttings to be combined with species propagated in vitro to form a cluster of young plants. To that end, in vitro plants must first be carefully adapted to a greenhouse climate under suitable conditions. This operation is referred to as hardening. During this phase, the in vitro plants form roots which grow into the propagation pot. Hardening is frequently carried out in small polytunnels with very high humidity. Once hardening has taken place, in vitro plants can be cultivated further in a normal manner, for example together with species propagated by means of cuttings.

Still further, this embodiment can also be used to further cultivate species propagated vegetatively by means of cuttings together with species propagated generatively by means of seeds. However, the required cultivation conditions after sowing are very specific and fundamentally different from the cultivation conditions which an unrooted cutting requires during the rooting phase. Therefore, unrooted cuttings and sown seeds are first precultivated separately, the required humidity and the humidity of the substrate in particular being notably different. However, once germination has taken place and a sufficient number of roots have formed, seedlings have cultivation needs which are similar to the cultivation needs of rooted cuttings. It is therefore possible, following the mentioned separate precultivation, for rooted cuttings and seedlings to be cultivated further together to form a cluster of mixed young plants. Like the rooted cuttings, the seedlings also grow together with the other plants of a cluster via their roots.

The methods according to the present disclosure are preferably carried out using so-called cultivation trays on each of which a large number of growing containers is arranged, conventionally in lines. Each growing container can provide space for two, three, four or five propagation pots. For example, in the case of a growing container for three propagation pots, the pots can be arranged approximately in the form of a three-leafed clover; in the case of four propagation pots, they can be arranged in the form of a square; in the case of five propagation pots, they can be arranged in a way that a central propagation pot is surrounded by the other four propagation pots, etc. It is also possible to arrange more than five propagation pots in a growing container, for example even six or seven propagation pots are conceivable, but it can become more difficult, as the number of propagation pots increases, depending on their arrangement in the growing container, to ensure the desired lateral contact of the propagation pots.

According to the present disclosure a desired number of propagation pots are provided which allow roots that form in the course of the process of cultivating the young plants to grow out of the sides of the propagation pot. The shape of the propagation pots is not critical, but all the propagation pots used preferably have the same shape. All the propagation pots provided contain a substrate which is suitable for the cultivation of the young plants.

A further embodiment of the disclosure comprises the further steps of removing the cluster of propagation pots from each growing container and planting each of the cluster(s) of propagation pots in a cultivation vessel for finished products, for example in a pot, a container or a hanging basket.

EXAMPLES

The present disclosure will be explained in more detail with reference to the following examples. However, the present invention is not limited thereto.

In the following examples, the results of 21 tests or trials performed by the applicants show that the methods according to the present disclosure work with a great number of plant varieties having different characteristics. Tables 1 to 6 reflect the results of the first embodiment described herein i.e. unrooted cuttings of the desired varieties are stuck in separate propagation pots and rooted together in a propagation tray. Each of Tables 1-3 table includes three trials. In each trial of a particular table the same combination of plants or varieties was tested. Each trial of a particular table employed a different combination of propagation pots and propagation trays, however, the same combinations of propagation pots and trays were used in the trials of Tables 1 to 3. Thus, for example, the same combination of propagation pots and trays were used in trials 1, 4 and 7 appearing on Tables 1-3, respectively. Similarly, different substrate was used for each trial included on a particular table, but the same substrates were used in at least one trial appearing on each of Tables 1-3. All of the trials shown in Tables 1-3 are categorized as Trial Version "a".

Table 1 depicts the results for trials 1-3 in which the combination of plants known as Trixi® Ayers Rock was tested. The differences in substrate and propagation pots and trays are noted in the table.

TABLE 1

Trial results Trixi 2.0/method 1

|  | Trial 1 | Trial 2 | Trial 3 |
|---|---|---|---|
| Method | 1 | 1 | 1 |
| Trial version | a | a | a |
| Trade name of the combination of plants | Trixi ® Ayers Rock | Trixi ® Ayers Rock | Trixi ® Ayers Rock |
| Variety 1 | Calibrachoa MiniFamous ® Apricot + Eye | Calibrachoa MiniFamous ® Apricot + Eye | Calibrachoa MiniFamous ® Apricot + Eye |
| Variety 2 | Verbena Fuego ® Bright Red | Verbena ® Fuego Bright Red | Verbena Fuego ® Bright Red |
| Variety 3 | Lobelia Curaçao ® Basket Dark Purple | Lobelia Curaçao ® Basket Dark Purple | Lobelia Curaçao ® Basket Dark Purple |
| Variety 4 | n/a | n/a | n/a |
| Product type | URC* | URC* | URC* |
| Pre-culture variety 1 | No | no | no |
| Pre-culture variety 2 | No | no | no |
| Pre-culture variety 3 | No | no | no |
| Substrate variety 1 | HAWITA Fruhstorfer SOMI 537/pH 4.5-4.8 | HAWITA Fruhstorfer SOMI 537/pH 4.5-4.8 | Spaghnum peat** |
| Substrate variety 2 | HAWITA Fruhstorfer SOMI 537/Standard | HAWITA Fruhstorfer SOMI 537/Standard | Spaghnum peat** |
| Substrate variety 3 | HAWITA Fruhstorfer SOMI 537/Standard | HAWITA Fruhstorfer SOMI 537/Standard | Spaghnum peat** |
| Substrate variety 4 | n/a | n/a | n/a |
| Treatment with growth retardants | 5 times during whole cultivation | 5 times during whole cultivation | 5 times during whole cultivation |
| Growth retardant/ concentration variety 1 | Dazide Enhance/0.2% | Dazide Enhance/0.2% | Dazide Enhance/0.2% |
| Growth retardant/ concentration variety 2 | Dazide Enhance/0.2% | Dazide Enhance/0.2% | Dazide Enhance/0.2% |
| Growth retardant/ concentration variety 3 | Dazide Enhance/0.2% | Dazide Enhance/0.2% | Dazide Enhance/0.2% |
| Growth retardant/ concentration variety 4 | n/a | n/a | n/a |
| Propagation pot | Paper pot 2 cm | Paper pot 2 cm | Jiffy-7 peat plug 2 cm |
| Propagation tray | Herkuplast 84-3.5 | Herkuplast Mickey-Mouse | Herkuplast Mickey-Mouse |
| Time period until the first roots grow out at the sides of the pot | 2 weeks | 2 weeks | 2 weeks |
| Time period until the roots form a network and the root balls grow together | 5 weeks | 5 weeks | 5 weeks |

*URC = Unrooted cutting
**Spaghnum peat: pH 5.2-5.4/EC 0.8-0.9

Table 2 depicts the results for trials 4-6 in which the combination of plants known as Trixi® Lemon Sorbet was tested. The differences in substrate and propagation pots and trays are noted in the table.

TABLE 2

Trial results Trixi 2.0/method 1

|  | Trial 4 | Trial 5 | Trial 6 |
|---|---|---|---|
| Method | 1 | 1 | 1 |
| Trial version | a | a | a |
| Trade name of the combination of plants | Trixi ® Lemon Sorbet | Trixi ® Lemon Sorbet | Trixi ® Lemon Sorbet |
| Variety 1 | Petunia Famous Compact Yellow | Petunia Famous Compact Yellow | Petunia Famous Compact Yellow |
| Variety 2 | Calibrachoa MiniFamous ® Apricot + Eye | Calibrachoa MiniFamous ® Apricot + Eye | Calibrachoa MiniFamous ® Apricot + Eye |
| Variety 3 | Bidens ® Eldoro | Bidens ® Eldoro | Bidens ® Eldoro |
| Variety 4 | n/a | n/a | n/a |
| Product type | URC* | URC* | URC* |
| Pre-culture variety 1 | No | no | no |
| Pre-culture variety 2 | No | no | no |
| Pre-culture variety 3 | No | no | no |

TABLE 2-continued

Trial results Trixi 2.0/method 1

| | Trial 4 | Trial 5 | Trial 6 |
|---|---|---|---|
| Substrate variety 1 | HAWITA Fruhstorfer SOMI 537/pH 4.5-4.8 | HAWITA Fruhstorfer SOMI 537/pH 4.5-4.8 | Spaghnum peat** |
| Substrate variety 2 | HAWITA Fruhstorfer SOMI 537/pH 4.5-4.8 | HAWITA Fruhstorfer SOMI 537/pH 4.5-4.8 | Spaghnum peat** |
| Substrate variety 3 | HAWITA Fruhstorfer SOMI 537/Standard | HAWITA Fruhstorfer SOMI 537/Standard | Spaghnum peat** |
| Substrate variety 4 | n/a | n/a | n/a |
| Treatment with growth retardants | 5 times during whole cultivation | 5 times during whole cultivation | 5 times during whole cultivation |
| Growth retardant/ concentration variety 1 | Dazide Enhance/0.2% | Dazide Enhance/0.2% | Dazide Enhance/0.2% |
| Growth retardant/ concentration variety 2 | Dazide Enhance/0.2% | Dazide Enhance/0.2% | Dazide Enhance/0.2% |
| Growth retardant/ concentration variety 3 | Dazide Enhance/0.2% | Dazide Enhance/0.2% | Dazide Enhance/0.2% |
| Growth retardant/ concentration variety 4 | n/a | n/a | n/a |
| Propagation pot | Paper pot 2 cm | Paper pot 2 cm | Jiffy-7 peat plug 2 cm |
| Propagation tray | Herkuplast 84-3.5 | Herkuplast Mickey-Mouse | Herkuplast Mickey-Mouse |
| Time period until the first roots grow out at the sides of the pot | 2 weeks | 2 weeks | 2 weeks |
| Time period until the roots form a network and the root balls grow together | 5 weeks | 5 weeks | 5 weeks |

*URC = Unrooted cutting
**Spaghnum peat: pH 5.2-5.4/EC 0.8-0.9

Table 3 depicts the results for trials 7-9 in which the combination of plants known as Trixi® Liberty Bell was tested. The differences in substrate and propagation pots and trays are noted in the table.

TABLE 3

Trial results Trixi 2.0/method 1

| | Trial 7 | Trial 8 | Trial 9 |
|---|---|---|---|
| Method | 1 | 1 | 1 |
| Trial version | a | a | a |
| Trade name of the combination of plants | Trixi ® Liberty Bell | Trixi ® Liberty Bell | Trixi ® Liberty Bell |
| Variety 1 | Petunia Famous Compact Red Fire | Petunia Famous Compact Red Fire | Petunia Famous Compact Red Fire |
| Variety 2 | Calibrachoa MiniFamous ® Midnight Blue | Calibrachoa MiniFamous ® Midnight Blue | Calibrachoa MiniFamous ® Midnight Blue |
| Variety 3 | Verbena Lascar ® White | Verbena Lascar ® White | Verbena Lascar ® White |
| Variety 4 | n/a | n/a | n/a |
| Product type | URC* | URC* | URC* |
| Pre-culture variety 1 | No | no | no |
| Pre-culture variety 2 | No | no | no |
| Pre-culture variety 3 | No | no | no |
| Substrate variety 1 | HAWITA Fruhstorfer SOMI 537/pH 4.5-4.8 | HAWITA Fruhstorfer SOMI 537/pH 4.5-4.8 | Spaghnum peat** |
| Substrate variety 2 | HAWITA Fruhstorfer SOMI 537/pH 4.5-4.8 | HAWITA Fruhstorfer SOMI 537/pH 4.5-4.8 | Spaghnum peat** |
| Substrate variety 3 | HAWITA Fruhstorfer SOMI 537/Standard | HAWITA Fruhstorfer SOMI 537/Standard | Spaghnum peat** |
| Substrate variety 4 | n/a | n/a | n/a |
| Treatment with growth retardants | 5 times during whole cultivation | 5 times during whole cultivation | 5 times during whole cultivation |
| Growth retardant/ concentration variety 1 | Dazide Enhance/0.2% | Dazide Enhance/0.2% | Dazide Enhance/0.2% |
| Growth retardant/ concentration variety 2 | Dazide Enhance/0.2% | Dazide Enhance/0.2% | Dazide Enhance/0.2% |
| Growth retardant/ concentration variety 3 | Dazide Enhance/0.2% | Dazide Enhance/0.2% | Dazide Enhance/0.2% |
| Growth retardant/ concentration variety 4 | n/a | n/a | n/a |

TABLE 3-continued

Trial results Trixi 2.0/method 1

|  | Trial 7 | Trial 8 | Trial 9 |
|---|---|---|---|
| Propagation pot | Paper pot 2 cm | Paper pot 2 cm | Jiffy-7 peat plug 2 cm |
| Propagation tray | Herkuplast 84-3.5 | Herkuplast Mickey-Mouse | Herkuplast Mickey-Mouse |
| Time period until the first roots grow out at the sides of the pot | 2 weeks | 2 weeks | 2 weeks |
| Time period until the roots form a network and the root balls grow together | 5 weeks | 5 weeks | 5 weeks |

*URC = Unrooted cutting
**Spaghnum peat: pH 5.2-5.4/EC 0.8-0.9

Tables 1 to 3 show that for the three different plant or variety combinations tested, using different propagation pots and/or different propagation trays has no discernible influence on the time period needed for growing roots out at the sides of the propagation pot and, subsequently, to have these roots form a network binding the propagation pots together, thus forming a cluster of propagation pots.

Table 4 shows the result of a variation of trial version a, where the substrate which was filled into each propagation pot was pre-treated with a growth retardant differently for each plant variety within the given combination, this is referred to herein as trial version b. In Trial 10 the substrate used for plant variety 1 was not pre-treated with a growth retardant, the substrate used for variety 2 was pre-treated with a growth retardant at a first concentration, and the substrate used for variety 3 was pre-treated with the growth retardant at a second concentration, which in this case was double the concentration as before. The time needed for growing the first roots out at the sides of the propagation pot and for subsequently forming a network of roots was identical to the results seen in trial version a (Tables 1-3).

TABLE 4

Trial results Trixi 2.0/method 1

|  | Trial 10 |
|---|---|
| Method | 1 |
| Trial version | b |
| Trade name of the combination of plants | n/a |
| Variety 1 | Calibrachoa MiniFamous ® Dark Red |
| Variety 2 | Calibrachoa MiniFamous ® White |
| Variety 3 | Calibrachoa MiniFamous ® Midnight Blue |
| Variety 4 | n/a |
| Product type | URC* |
| Pre-culture variety 1 | no |
| Pre-culture variety 2 | no |
| Pre-culture variety 3 | no |
| Substrate variety 1 | HAWITA Fruhstorfer SOMI 537/pH 4.5-4.8 |
| Substrate variety 2 | HAWITA Fruhstorfer SOMI 537/pH 4.5-4.8 pre-treated with Bonzi 0.1% |
| Substrate variety 3 | HAWITA Fruhstorfer SOMI 537/pH 4.5-4.8 pre-treated with Bonzi 0.2% |
| Substrate variety 4 | n/a |
| Treatment with growth retardants | 5 times during whole cultivation |
| Growth retardant/concentration variety 1 | Dazide Enhance/0.2% |
| Growth retardant/concentration variety 2 | Dazide Enhance/0.2% |
| Growth retardant/concentration variety 3 | Dazide Enhance/0.2% |
| Growth retardant/concentration variety 4 | n/a |
| Propagation pot | Paper pot 2 cm |
| Propagation tray | Herkuplast Mickey-Mouse |
| Time period until the first roots grow out at the sides of the pot | 2 weeks |
| Time period until the roots form a network and the root balls grow together | 5 weeks |

*URC = Unrooted cutting
**Spaghnum peat: pH 5.2-5.4/EC 0.8-0.9

Tables 5 and 6 depict the results of trial version c and each table relates to a given combination of plant varieties. Note that Table 5 relates to a combination of three plant varieties, while Table 6 relates to a combination of four plant varieties. The four trials in Table 5 utilized four different combinations of propagation pots and trays, the trials in Table 6 utilized the same combinations. Unlike the trials of Tables 1-3, the trials in Tables 5 and 6 all used the same substrate.

TABLE 5

Trial results Trixi 2.0/method 1

|  | Trial 11 | Trial 12 | Trial 13 | Trial 14 |
|---|---|---|---|---|
| Method | 1 | 1 | 1 | 1 |
| Trial version | c | c | c | c |
| Trade name of the combination of plants | n/a | n/a | n/a | n/a |
| Variety 1 | Petunia Famous Yellow | Petunia Famous Yellow | Petunia Famous Yellow | Petunia Famous Yellow |

TABLE 5-continued

Trial results Trixi 2.0/method 1

|  | Trial 11 | Trial 12 | Trial 13 | Trial 14 |
|---|---|---|---|---|
| Variety 2 | Calibrachoa MiniFamous ® Orange | Calibrachoa MiniFamous ® Orange | Calibrachoa MiniFamous ® Orange | Calibrachoa MiniFamous ® Orange |
| Variety 3 | Bidens ® Eldoro Grande | Bidens ® Eldoro Grande | Bidens ® Eldoro Grande | Bidens ® Eldoro Grande |
| Variety 4 | n/a | n/a | n/a | n/a |
| Product type | URC* | URC* | URC* | URC* |
| Pre-culture variety 1 | no | no | no | no |
| Pre-culture variety 2 | no | no | no | no |
| Pre-culture variety 3 | no | no | no | no |
| Substrate variety 1 | HAWITA Fruhstorfer SOMI 537/pH 4.5-4.8 | HAWITA Fruhstorfer SOMI 537/pH 4.5-4.8 | HAWITA Fruhstorfer SOMI 537/pH 4.5-4.8 | HAWITA Fruhstorfer SOMI 537/pH 4.5-4.8 |
| Substrate variety 2 | HAWITA Fruhstorfer SOMI 537/pH 4.5-4.8 | HAWITA Fruhstorfer SOMI 537/pH 4.5-4.8 | HAWITA Fruhstorfer SOMI 537/pH 4.5-4.8 | HAWITA Fruhstorfer SOMI 537/pH 4.5-4.8 |
| Substrate variety 3 | HAWITA Fruhstorfer SOMI 537/Standard | HAWITA Fruhstorfer SOMI 537/Standard | HAWITA Fruhstorfer SOMI 537/Standard | HAWITA Fruhstorfer SOMI 537/Standard |
| Substrate variety 4 | n/a | n/a | n/a | n/a |
| Treatment with growth retardants | 5 times during whole cultivation | 5 times during whole cultivation | 5 times during whole cultivation | 5 times during whole cultivation |
| Growth retardant/ concentration variety 1 | Dazide Enhance/ 0.2% | Dazide Enhance/ 0.2% | Dazide Enhance/ 0.2% | Dazide Enhance/0.2% |
| Growth retardant/ concentration variety 2 | Dazide Enhance/ 0.2% | Dazide Enhance/ 0.2% | Dazide Enhance/ 0.2% | Dazide Enhance/0.2% |
| Growth retardant/ concentration variety 3 | Dazide Enhance/ 0.2% | Dazide Enhance/ 0.2% | Dazide Enhance/ 0.2% | Dazide Enhance/0.2% |
| Growth retardant/ concentration variety 4 | n/a | n/a | n/a | n/a |
| Propagation pot | Paper pot 2 cm | Paper pot 2.5 cm | Paper pot 2 cm | Paper pot 2.5 cm |
| Propagation tray | Herkuplast 84-3.5 | Herkuplast HPD 28-R | Bachmann 65402 | Modiform 1967 |
| Time period until the first roots grow out at the sides of the pot | 2 weeks | 2 weeks | 2 weeks | 2 weeks |
| Time period until the roots form a network and the root balls grow together | 5 weeks | 5 weeks | 5 weeks | 5 weeks |

*URC = Unrooted cutting
**Spaghnum peat: pH 5.2-5.4/EC 0.8-0.9

TABLE 6

Trial results Trixi 2.0/method 1

|  | Trial 15 | Trial 16 | Trial 17 | Trial 18 |
|---|---|---|---|---|
| Method | 1 | 1 | 1 | 1 |
| Trial version | c | c | c | c |
| Trade name of the combination of plants | n/a | n/a | n/a | n/a |
| Variety 1 | Petunia Famous Yellow | Petunia Famous Yellow | Petunia Famous Yellow | Petunia Famous Yellow |
| Variety 2 | Calibrachoa MiniFamous ® Orange | Calibrachoa MiniFamous ® Orange | Calibrachoa MiniFamous ® Orange | Calibrachoa MiniFamous ® Orange |
| Variety 3 | Bidens ® Eldoro Grande | Bidens ® Eldoro Grande | Bidens ® Eldoro Grande | Bidens ® Eldoro Grande |
| Variety 4 | Lobelia Curaçao ® Basket Dark Blue | Lobelia Curaçao ® Basket Dark Blue | Lobelia Curaçao ® Basket Dark Blue | Lobelia Curaçao ® Basket Dark Blue |
| Product type | URC* | URC* | URC* | URC* |
| Pre-culture variety 1 | no | no | no | no |
| Pre-culture variety 2 | no | no | no | no |
| Pre-culture variety 3 | no | no | no | no |

TABLE 6-continued

Trial results Trixi 2.0/method 1

| | Trial 15 | Trial 16 | Trial 17 | Trial 18 |
|---|---|---|---|---|
| Substrate variety 1 | HAWITA Fruhstorfer SOMI 537/pH 4.5-4.8 | HAWITA Fruhstorfer SOMI 537/pH 4.5-4.8 | HAWITA Fruhstorfer SOMI 537/pH 4.5-4.8 | HAWITA Fruhstorfer SOMI 537/pH 4.5-4.8 |
| Substrate variety 2 | HAWITA Fruhstorfer SOMI 537/pH 4.5-4.8 | HAWITA Fruhstorfer SOMI 537/pH 4.5-4.8 | HAWITA Fruhstorfer SOMI 537/pH 4.5-4.8 | HAWITA Fruhstorfer SOMI 537/pH 4.5-4.8 |
| Substrate variety 3 | HAWITA Fruhstorfer SOMI 537/Standard | HAWITA Fruhstorfer SOMI 537/Standard | HAWITA Fruhstorfer SOMI 537/Standard | HAWITA Fruhstorfer SOMI 537/Standard |
| Substrate variety 4 | HAWITA Fruhstorfer SOMI 537/Standard | HAWITA Fruhstorfer SOMI 537/Standard | HAWITA Fruhstorfer SOMI 537/Standard | HAWITA Fruhstorfer SOMI 537/Standard |
| Treatment with growth retardants | 5 times during whole cultivation | 5 times during whole cultivation | 5 times during whole cultivation | 5 times during whole cultivation |
| Growth retardant/concentration variety 1 | Dazide Enhance/0.2% | Dazide Enhance/0.2% | Dazide Enhance/0.2% | Dazide Enhance/0.2% |
| Growth retardant/concentration variety 2 | Dazide Enhance/0.2% | Dazide Enhance/0.2% | Dazide Enhance/0.2% | Dazide Enhance/0.2% |
| Growth retardant/concentration variety 3 | Dazide Enhance/0.2% | Dazide Enhance/0.2% | Dazide Enhance/0.2% | Dazide Enhance/0.2% |
| Growth retardant/concentration variety 4 | Dazide Enhance/0.2% | Dazide Enhance/0.2% | Dazide Enhance/0.2% | Dazide Enhance/0.2% |
| Propagation pot | Paper pot 2 cm | Paper pot 2.5 cm | Paper pot 2 cm | Paper pot 2.5 cm |
| Propagation tray | Herkuplast 84-3.5 | Herkuplast HPD 28-R | Bachmann 65402 | Modiform 1967 |
| Time period until the first roots grow out at the sides of the pot | 2 weeks | 2 weeks | 2 weeks | 2 weeks |
| Time period until the roots form a network and the root balls grow together | 5 weeks | 5 weeks | 5 weeks | 5 weeks |

*URC = Unrooted cutting
**Spaghnum peat: pH 5.2-5.4/EC 0.8-0.9

Tables 5 and 6 demonstrate that the use of different propagation pots and different propagation trays has no discernible influence on the time period needed to grow roots out at the sides of the propagation pot and to then form a network of roots.

Table 7 depicts the results from trials 19-21 which employ the second embodiment of the present disclosure, where unrooted cuttings were stuck in separate propagation pots and are then initially rooted under different conditions before being put together in a common propagation tray. Trial 19 in table 7 relates to combining woody and non-woody (i.e. herbaceous) propagation material (trial version d). Trial 20 in table 7 shows significantly differing pre-culture periods wherein the plant variety combination includes in vitro material (trial version e). Finally, trial 21 in table 7 shows that generative and vegetative propagation material may be combined (trial version f) using the second method alternative of the present invention. With the second method of the second embodiment, the time period needed until the roots form a network binding the propagation pots together as a cluster varied between 2 and 3 weeks following pre-cultivation time.

TABLE 7

Trial results Trixi 2.0/method 2

| | Trial 19 | Trial 20 | Trial 21 |
|---|---|---|---|
| Method | 2 | 2 | 2 |
| Trial version | d | e | f |
| Trade name of the combination of plants | n/a | n/a | n/a |
| Variety 1 | Rosmarin (woody) | Geranium Rozanne (in vitro) | Tagetes Yellow (generative) |

TABLE 7-continued

Trial results Trixi 2.0/method 2

| | Trial 19 | Trial 20 | Trial 21 |
|---|---|---|---|
| Variety 2 | Calibrachoa MiniFamous ® Midnight Blue | Sedum Jelly Bean Green | Pelargonium peltatum Royal ® White |
| Variety 3 | Pelargonium peltatum Royal ® White | Bidens Eldoro ® | Lobelia Curaçao ® Dark Blue |
| Product type | URC* | in vitro/URC* | Seeds/URC* |
| Pre-culture variety 1 | 5 weeks | 6 weeks | 3 weeks |
| Pre-culture variety 2 | 3 weeks | 2 weeks | 2 weeks |
| Pre-culture variety 3 | 3 weeks | 1 week | 2 weeks |
| Substrate variety 1 | HAWITA Fruhstorfer SOMI 537/Standard | HAWITA Fruhstorfer SOMI 537/Standard | HAWITA Fruhstorfer SOMI 537/Standard |
| Substrate variety 2 | HAWITA Fruhstorfer SOMI 537/pH 4.5-4.8 | HAWITA Fruhstorfer SOMI 537/Standard | HAWITA Fruhstorfer SOMI 537/Standard |
| Substrate variety 3 | HAWITA Fruhstorfer SOMI 537/Standard | HAWITA Fruhstorfer SOMI 537/Standard | HAWITA Fruhstorfer SOMI 537/Standard |
| Treatment with growth retardants/variety 1 | 4 times during pre-cultivation | n/a | n/a |
| Treatment with growth retardants/variety 2 | n/a | n/a | n/a |
| Treatment with growth retardants variety 3 | n/a | dipping treatment before potting, thereafter 3 times spraying | 3 times during pre-cultivation |
| Growth retardant/concentration variety 1 | Dazide Enhance 0.2% | n/a | n/a |
| Growth retardant/concentration variety 2 | n/a | n/a | n/a |
| Growth retardant/concentration variety 3 | n/a | dipping treatment: Dazide Enhance 0.3%, spraying: Dazide Enhance 2% | Dazide Enhance 0.2% |
| Propagation pot | Paper pot 2.5 cm | Paper pot 2.5 cm | Paper pot 2.5 cm |
| Propagation tray | Modiform 1967 | Modiform 1967 | Modiform 1967 |
| Time period until the roots form a network and the root balls grow together | 2 weeks after loading of the growing container with propagation pots | 3 weeks after loading of the growing container with propagation pots | 3 weeks after loading of the growing container with propagation pots |

*URC = unrooted cutting

What is claimed is:

1. A method for the cultivation of a plurality of young plants which differ in terms of species or variety to form a group of young plants which can be handled as a unit, comprising:
    providing a plurality of propagation pots containing a substrate, each of the plurality of propagation pots having an open top end and a lateral peripheral surface, which allow roots that form in each of the plurality of propagation pots to grow out of the peripheral surfaces; providing at least one growing container with a plurality of cavities formed therein, the plurality of cavities including sets of cavities that are next to each other and the cavities in each set open into each other to form a cluster, each cavity having a shape so as to firmly position a corresponding propagation put in lateral peripheral contact with at least one other propagation put in the same cluster, and each cavity configured to support a bottom portion of the corresponding propagation pot;
    loading the at least one growing container with the plurality of propagation pots in such a manner that one propagation pot is arranged in each cavity and each propagation pot of a cluster is in contact with one another in at least a portion of their lateral peripheral surface, while another portion of their peripheral surfaces are not in contact with one another, the bottom portion of each propagation pot is supported by a corresponding cavity;
    introducing at least one cutting or seed into each propagation pot, wherein at least one propagation pot receives a cutting or seed, variety or species, different from at least one other propagation pot; and
    allowing roots to form in the propagation pots of each growing container until roots emerging from the portions of the lateral peripheral surfaces of the propagation pots in contact with one another have formed a network of roots which binds the propagation pots in the growing container together as a cluster of propagation pots and holds them together.

2. The method according to claim 1, wherein the substrate contained in the propagation pots is adapted to the particular variety or species.

3. The method according to claim 1, wherein the substrate has a water-retention capacity which is adapted to the particular variety or species.

4. The method according to claim 1, wherein the substrate has a pH value which is adapted to the particular variety or species.

5. The method according to claim 1, wherein depending on the variety or species present in a propagation pot, the substrate contains a growth regulator.

6. The method according claim 1, wherein depending on the variety or species present in a propagation pot, the substrate contains a plant-protection agent.

7. The method according to claim 6, wherein the plant-protection agent is a fungicide.

8. The method according to claim 1, wherein the portion of the peripheral surfaces not in contact with one another is between two lateral peripheral surfaces that are in contact with one another.

9. The method according to claim 1, wherein the plurality of cavities of the growing container are defined by arcuate walls such that only a portion of the peripheral surfaces of the propagation pots are contained by the arcuate walls.

10. The method according to claim 1 wherein multiple growing containers are arranged on a cultivation tray.

11. The method according to claim 1, wherein the propagation pots are selected from a group consisting of containing pots made of nonwoven material, peat, wood fiber, peat substrates combined with an organic adhesive and combinations thereof.

12. The method according to claim 1 further comprising removing the cluster of two or more propagation pots from each growing container and repotting each cluster of propagation pots in a cultivation vessel for finished products.

13. A method for the cultivation of a plurality of young plants which differ in terms of species or variety to form a group of young plants which can be handled as a unit, comprising:
providing a plurality of propagation pots containing a substrate, each of the plurality of propagation pots having an open top end and a lateral peripheral surface, which allow roots that form in each of the plurality of propagation pots to grow out of the lateral peripheral surfaces;
introducing at least cuttings or seed into each propagation pot, wherein at least one propagation pot receives a cutting or seed, variety or species, different from at least one other propagation pot;
allowing roots to form in the substrate of each propagation pot; providing at least one growing container with a plurality of cavities formed therein, the plurality of cavities including sets of cavities that are next to each other and the cavities in each set open into each other to form a cluster, each cavity having a shape so as to firmly position a corresponding propagation put in lateral peripheral contact with at least one other propagation put in the same cluster, and each cavity configured to support a bottom portion of the corresponding propagation pot;
loading at least one growing container with the plurality of propagation pots in such a manner that one propagation pot is arranged in each cavity and each propagation pot of a cluster is in contact with one another in at least a portion of their lateral peripheral surface, while another portion of their lateral peripheral surfaces are not in contact with one another, the bottom portion of each propagation pot is supported by a corresponding cavity; and
allowing roots to form in the propagation pots of each growing container until roots emerging from the portions of the lateral peripheral surfaces of the propagation pots in contact with one another have formed a network of roots which binds the propagation pots in a growing container together as a cluster of propagation pots and holds them together.

14. The method according to claim 13, wherein the substrate contained in the propagation pots is adapted to the particular variety or species.

15. The method according to claim 13, wherein the substrate has a water-retention capacity which is adapted to the particular variety or species.

16. The method according to claim 13, wherein the substrate has a pH value which is adapted to the particular variety or species.

17. The method according to claim 13, wherein depending on the variety or species present in a propagation pot, the substrate contains a growth regulator.

18. The method according to claim 13, wherein depending on the variety or species present in a propagation pot, the substrate contains a plant-protection agent.

19. The method according to claim 18, wherein the plant-protection agent is a fungicide.

20. The method according to claim 13 wherein multiple growing containers are arranged on a cultivation tray.

21. The method according to claim 13, wherein in that the propagation pots are selected from a group consisting of containing pots made of nonwoven material, peat, wood fiber, peat substrates combined with an organic adhesive and combinations thereof.

22. The method according to claim 13, further comprising removing the cluster of two or more propagation pots from each growing container and repotting each cluster of propagation pots in a cultivation vessel for finished products.

* * * * *